UNITED STATES PATENT OFFICE.

SEVERIN SORENSEN, OF DAZEY, NORTH DAKOTA.

COFFEE SUBSTITUTE.

1,288,727.  Specification of Letters Patent.  Patented Dec. 24, 1918.

No Drawing.  Application filed August 8, 1916.  Serial No. 113,755.

*To all whom it may concern:*

Be it known that I, SEVERIN SORENSEN, a citizen of the United States, residing at Dazey, in the county of Barnes and State of North Dakota, have invented certain new and useful Improvements in Coffee Substitutes, of which the following is a specification.

This invention relates to food products and has as its object to provide a product which may be employed as a substitute for coffee or as a substitute for tea or in the preparation of various other beverages.

The base of the product consists of a mixture of cereals such for example as wheat or rye, or both if desired, approximately seventy-six per cent., molasses approximately sixteen per cent., and both the whites and yolks of eggs approximately eight per cent.

In preparing this base the cereals are cleaned and ground to particles of medium size in a suitable manner and are then mixed with the molasses and the whites and yolks of the eggs. The mixture is then roasted in an oven or any roasting drum until it is of a dark brown color and at a temperature of from two hundred and fifty degrees to three hundred and fifty degrees Fahrenheit.

The roasted mixture is then cooled and passed between rollers by which operation it is crushed and it is then passed through a sieve or screen, after which it is ready for use.

This base may be employed alone as a coffee substitute or, if desired, a beverage may be prepared therefrom as in the preparation of coffee and the beverage may be mixed with suitable flavoring extracts, using about one teaspoonful of the extract to a cup or glass of the beverage.

If it is desired to produce a substitute for tea, I take a suitable quantity of hand picked alfalfa and clover or both and dry the same in an oven or, if desired, air cure the same until the leaves may be readily broken but before they are actually roasted. The leaves are then passed between rollers or otherwise ground to particles of the desired size. In preparing a beverage from the plant product prepared as above, about one to two parts of the plant product by measure are mixed with four parts of the base above described and the beverage is prepared in the same manner as in the preparation of tea or coffee.

The plant product described above may be employed alone as a laxative and remedy for colds.

Having thus described the invention, what is claimed as new is:

A base for a beverage comprising a mixture of a cereal, molasses, and the whites and yolks of eggs, which base is roasted and ground, and a plant product consisting of the leaves of plants such as alfalfa and clover, dried and ground.

In testimony whereof I affix my signature.

SEVERIN SORENSEN. [L. S.]

Copies of this patent may be obtained for five cents each, by addressing the "Commissioner of Patents, Washington, D. C."